United States Patent
Taira et al.

(10) Patent No.: US 9,330,851 B2
(45) Date of Patent: May 3, 2016

(54) ELECTRODE MATERIAL FOR ALUMINUM ELECTROLYTIC CAPACITOR, AND METHOD FOR PRODUCING SAME

(75) Inventors: Toshifumi Taira, Osaka (JP); Kenji Muramatsu, Osaka (JP); Masashi Mehata, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 134 days.

(21) Appl. No.: 14/232,770

(22) PCT Filed: Jul. 11, 2012

(86) PCT No.: PCT/JP2012/067653
§ 371 (c)(1),
(2), (4) Date: Jan. 15, 2014

(87) PCT Pub. No.: WO2013/011881
PCT Pub. Date: Jan. 24, 2013

(65) Prior Publication Data
US 2014/0211375 A1    Jul. 31, 2014

(30) Foreign Application Priority Data
Jul. 15, 2011 (JP) ................................ 2011-156748

(51) Int. Cl.
*H01G 9/042* (2006.01)
*H01G 9/00* (2006.01)
(Continued)

(52) U.S. Cl.
CPC ............. *H01G 9/0029* (2013.01); *H01G 9/045* (2013.01); *H01G 9/052* (2013.01); *H01G 9/0525* (2013.01)

(58) Field of Classification Search
CPC ........... H01G 9/042; H01G 9/08; H01G 9/10; H01G 9/145
USPC ......... 361/529, 516–519, 509–512, 523, 525, 361/528, 535–536
See application file for complete search history.

(56) References Cited

U.S. PATENT DOCUMENTS

| 3,004,332 A | 10/1961 | Werner |
| 3,196,323 A | 7/1965 | Rogers et al. |

(Continued)

FOREIGN PATENT DOCUMENTS

| DE | 4127743 A1 | 3/1993 |
| JP | 61-184812 A | 8/1986 |

(Continued)

OTHER PUBLICATIONS

International Search Report, dated Oct. 16, 2012, issued in corresponding application No. PCT/JP2012/067653.
(Continued)

*Primary Examiner* — Nguyen T Ha
(74) *Attorney, Agent, or Firm* — Westerman, Hattori, Daniels & Adrian, LLP

(57) ABSTRACT

An electrode material for an aluminum electrolytic capacitor, comprising, as constituent elements, sintered body of a powder of at least one member selected from the group consisting of aluminum and aluminum alloys, and an aluminum foil substrate supporting the sintered body thereon, wherein (1) the powder has an average particle size $D_{50}$ of 0.5 to 100 μm, (2) the sintered body is formed on one surface or both surfaces of the aluminum foil substrate and has a total thickness of 10 to 1,000 μm, (3) the porosity of the sintered body is 35 to 49% by volume, and (4) the sintered body is obtained by applying a rolling process to a film made from a composition comprising a powder of at least one member selected from the group consisting of aluminum and aluminum alloys, and subsequently sintering the film.

3 Claims, 1 Drawing Sheet

(51) Int. Cl.
*H01G 9/045* (2006.01)
*H01G 9/052* (2006.01)

(56) References Cited

U.S. PATENT DOCUMENTS

| | | | |
|---|---|---|---|
| 3,258,826 | A | 7/1966 | Boone et al. |
| 3,732,470 | A | 5/1973 | Robinson |
| 4,633,373 | A | 12/1986 | Phillips |
| 4,888,666 | A | 12/1989 | Naitoh et al. |
| 4,907,130 | A | 3/1990 | Boulloy et al. |
| 5,473,503 | A | 12/1995 | Sakata et al. |
| 6,785,123 | B2 | 8/2004 | Keser |
| 6,873,518 | B2 | 3/2005 | Masuda et al. |
| 6,914,769 | B2 | 7/2005 | Welsch et al. |
| 7,320,714 | B2 | 1/2008 | Keser |
| 7,388,740 | B2 | 6/2008 | Ro et al. |
| 7,456,073 | B2 | 11/2008 | Fife et al. |
| 7,760,489 | B2 | 7/2010 | Fujita et al. |
| 8,213,159 | B2 | 7/2012 | Imanaka et al. |
| 2006/0028787 | A1 | 2/2006 | Yoshida et al. |
| 2006/0204735 | A1 | 9/2006 | Naito |
| 2008/0094781 | A1 | 4/2008 | Otaki et al. |
| 2009/0021894 | A1 | 1/2009 | Ning et al. |
| 2011/0038098 | A1* | 2/2011 | Taira ............ H01G 9/045 361/500 |
| 2011/0053764 | A1 | 3/2011 | Taira et al. |
| 2012/0094016 | A1 | 4/2012 | Taira et al. |
| 2012/0219817 | A1 | 8/2012 | Konishi et al. |
| 2012/0231262 | A1* | 9/2012 | Sone ............ H01G 9/045 428/328 |
| 2014/0098460 | A1 | 4/2014 | Taira et al. |
| 2014/0211375 | A1 | 7/2014 | Taira et al. |

FOREIGN PATENT DOCUMENTS

| | | | |
|---|---|---|---|
| JP | 63-124511 | A | 5/1988 |
| JP | 02-091918 | A | 3/1990 |
| JP | 02-267916 | A | 11/1990 |
| JP | 9-167720 | A | 6/1997 |
| JP | 11-199992 | A | 7/1999 |
| JP | 2000-012400 | A | 1/2000 |
| JP | 2004-336018 | A | 11/2004 |
| JP | 2004-343096 | A | 12/2004 |
| JP | 2004-363491 | A | 12/2004 |
| JP | 2006-049760 | A | 2/2006 |
| JP | 2006-108159 | A | 4/2006 |
| JP | 2006-186248 | A | 7/2006 |
| JP | 2008-098279 | A | 4/2008 |
| JP | 2011-052291 | A | 3/2011 |
| JP | 2011-52291 | A | 3/2011 |
| JP | 2011-74468 | A | 4/2011 |
| WO | 2004/088690 | A1 | 10/2004 |
| WO | 2007/091656 | A1 | 8/2007 |
| WO | 2010/146973 | A1 | 12/2010 |
| WO | 2011/070915 | A1 | 6/2011 |

OTHER PUBLICATIONS

International Search Report dated Aug. 14, 2012 issued in corresponding application No. PCT/JP2012/062927, issued in related U.S. Appl. No. 14/122,038 (2 pages).
International Search Report of PCT/JP2008/057782, mailing date Jul. 29, 2008, issued in related U.S. Appl. No. 12/988,405 (1 page).
Chen, "Solid Aluminum Electrolytic Capacitor", Xi'an Jiatong University Press, Oct. 1986, p. 184-197 (Cited in Chinese Office Action dated Dec. 21, 2011) Partial English Translation.
Chen, "Solid Aluminum Electrolytic Capacitor", Xian Jiatong University Press, dated Oct. 1986, p. 153 cited in Chinese Office Action dated Oct. 30, 2012. With Partial English Translation.
Chinese Office Action dated Dec. 21, 2011, issued in corresponding Chinese Patent Application No. 200880128783.4.(13 pages).
U.S. Office Action dated Sep. 10, 2012, issued in U.S. Appl. No. 12/988,405 (24 pages).
U.S. Office Action dated Jul. 9, 2014, issued in U.S. Appl. No. 12/988,405 (17 pages).
U.S. Office Action dated Jul. 1, 2013, issued in U.S. Appl. No. 12/988,405 (24 pages).
U.S. Office Action dated Feb. 28, 2013, issued in U.S. Appl. No. 12/988,405 (17 pages).
U.S. Office Action dated Feb. 24, 2014, issued in U.S. Appl. No. 12/988,405 (19 pages).
U.S. Office Action dated Dec. 29, 2014, issued in U.S. Appl. No. 12/988,405 (16 pages).
International Search Report dated Mar. 12, 2013, issued in corresponding application No. PCT/JP2013/052857, issued in co-pending U.S. Appl. No. 14/375,884. (2 pages).
U.S. Non-Final Office Action dated Jan. 22, 2015, issued in co-pending U.S. Appl. No. 14/375,884. (14 pages).
Extended European Search Report dated Jul. 10, 2015 issued in counterpart European Patent Application No. 12814958.0 (8 pages).
Non-Final Office Action dated Oct. 26, 2015, issued in U.S. Appl. No. 14/122,038 (28 pages).

* cited by examiner

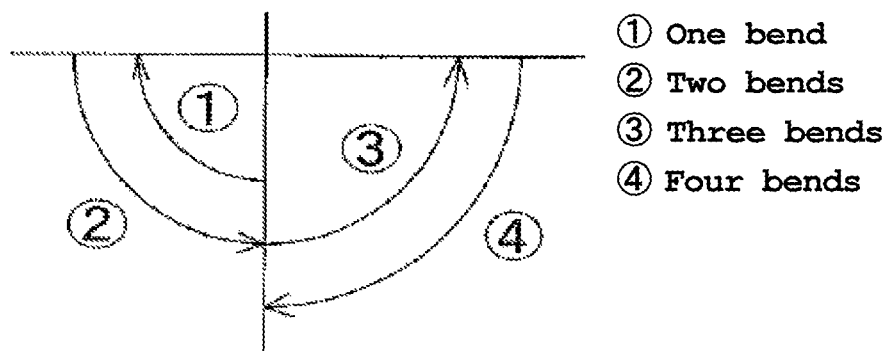

ELECTRODE MATERIAL FOR ALUMINUM ELECTROLYTIC CAPACITOR, AND METHOD FOR PRODUCING SAME

TECHNICAL FIELD

The present invention relates to an electrode material used for an aluminum electrolytic capacitor, particularly an anodic electrode material used for an aluminum electrolytic capacitor, and a method for producing the electrode material.

BACKGROUND ART

Aluminum foil is commonly used as an electrode material for aluminum electrolytic capacitors. The surface area of an aluminum foil can generally be increased by performing an etching treatment to form etching pits. The etched surface of the electrode material is then anodized to form an oxide film thereon, which functions as a dielectric. By etching the aluminum foil and applying one of various voltages to the surface thereof to match the voltage that is to be used, an anodic oxide film can be formed, thus enabling various aluminum anodes (foils) to be produced for electrolytic capacitors that are suited to specific applications.

However, etching treatments require the use of an aqueous hydrochloric acid solution that contains sulfuric acid, phosphoric acid, nitric acid, etc., in hydrochloric acid. Hydrochloric acid has a considerable environmental impact, and its disposal is also a burden from the viewpoint of the production process and economically. In the etching treatment, non-uniform etching pits may occur, pits may be easily united in some regions, and pits may be difficult to form in other regions, posing problems in pit control. Furthermore, the formation of many small pits may lower the hardness of an electrode material.

Therefore, the development of a novel method for increasing the surface area of an aluminum foil, which does not require etching, has been in demand. For example, Patent Literature 1 proposes a method that increases the surface area by adhering fine aluminum powder onto the surface of the aluminum foil by a vapor deposition method and then sintering. Patent Literature 2 proposes a method that increases the surface area by stacking aluminum particles while maintaining a space between each particle and sintering the particles. It was confirmed that this method makes it possible to obtain a surface area greater than the area of pits formed by etching.

However, the vapor deposition method disclosed in Patent Literature 1 has difficulty in adhering fine aluminum powder thickly; therefore, there is a limit to the increase in electrostatic capacitance. It is also difficult to deposit fine aluminum particles with sufficient space therebetween; therefore, this method is not suitable for producing an electrode material for medium- to high-voltage aluminum electrolytic capacitors.

In a mode using the sintered body disclosed in Patent Literature 2, it is necessary to make the sintered body thick in order to increase the electrostatic capacitance. However, when the sintered body is made thick, the bending strength undesirably lowers. Having a low bending strength causes the electrode material to break when it is wound to form a capacitor element. In particular, when the bending number (=the number of bends capable of withstanding breaking) is 0, the material will not endure processing in an actual chemical conversion line, thus lowering the mass production capability of the electrode material.

CITATION LIST

Patent Literature

PTL 1: JP2-267916A
PTL 2: JP2008-98279

SUMMARY OF INVENTION

Technical Problem

The present invention was made in view of the above problems. An object thereof is to provide an electrode material for an aluminum electrolytic capacitor that does not require any etching treatment and that has improved volumetric efficiency of electrostatic capacitance, bending strength, and a method for producing the same.

Solution to Problem

The present inventors conducted extensive research to achieve the above object, and found that a method wherein a sintered body of a powder of at least one member selected from the group consisting of aluminum and aluminum alloys is formed on an aluminum foil substrate using a specific production process can achieve the above object. The present invention has been accomplished based on this finding.

The present invention provides the following electrode material for aluminum electrolytic capacitors, and a method for producing the electrode material.

Item 1. An electrode material for an aluminum electrolytic capacitor, comprising, as constituent elements, a sintered body of a powder of at least one member selected from the group consisting of aluminum and aluminum alloys, and an aluminum foil substrate that supports the sintered body thereon, wherein (1) the powder has an average particle size $D_{50}$ of 0.5 to 100 µm, (2) the sintered body is formed on one surface or both surfaces of the aluminum foil substrate and has a total thickness of 10 to 1,000 µm, and (3) the sintered body has a porosity of 35 to 49% by volume, (4) the sintered body being obtainable by rolling a film made from a composition comprising a powder of at least one member selected from the group consisting of aluminum and aluminum alloys, followed by sintering.

Item 2. A method for producing an electrode material for an aluminum electrolytic capacitor, comprising the steps of:

Step 1: forming a film made from a composition comprising a powder of at least one member selected from the group consisting of aluminum and aluminum alloys on an aluminum foil substrate; wherein (1) the powder has an average particle size $D_{50}$ of 0.5 to 100 µm, (2) the film is formed on one surface or both surfaces of the aluminum foil substrate, and the total thickness of the film or films is more than 10 µm but not exceeding 1,150 µm, Step 2: rolling the film, after Step 1, in such a manner that when the rolled film is sintered, the sintered body has a porosity of 35 to 49% by volume.

Step 3: sintering the film, after Step 2, at a temperature in the range of 560 to 660° C., the method being free from an etching treatment.

Item 3. The production method according to Item 2, wherein rolling in Step 2 is performed in such a manner that the film has a reduction within a range that exceeds 0% but is 15% or less.

Advantageous Effects of Invention

The present invention provides an electrode material for an aluminum electrolytic capacitor comprising, as constituent elements, a sintered body of a powder of at least one member selected from the group consisting of aluminum and aluminum alloys, and an aluminum foil substrate for supporting the sintered body. Particularly due to the fact that a sintered body is formed on an aluminum foil substrate using a specific production process, this electrode material has an increased volume efficiency of electrostatic capacitance and improved bending strength compared to conventional materials. Conventionally, it was believed that, in order to increase the electrostatic capacitance, the sintered body should be thickened or the porosity of the sintered body should be increased. However, the present invention achieves the same level of electrostatic capacitance and an improved bending strength compared with conventional materials regardless of the fact that its sintered body is thinner and less porous than conventional materials.

BRIEF DESCRIPTION OF DRAWINGS

FIG. 1 illustrates how the number of bends is counted in the bending test in the Examples.

DESCRIPTION OF EMBODIMENTS

1. Electrode Material for Aluminum Electrolytic Capacitor

The electrode material for aluminum electrolytic capacitors of the present invention comprises, as constituent elements, a sintered body of a powder of at least one member selected from the group consisting of aluminum and aluminum alloys, and an aluminum foil substrate that supports the sintered body thereon, wherein (1) the powder has an average particle size $D_{50}$ of 0.5 to 100 μm, (2) the sintered body is formed on one surface or both surfaces of the aluminum foil substrate and has a total thickness of 10 to 1,000 μm, and (3) the sintered body has a porosity of 35 to 49% by volume, (4) the sintered body being obtainable by rolling a film made from a composition comprising a powder of at least one member selected from the group consisting of aluminum and aluminum alloys, followed by sintering.

The electrode material of the present invention having the above features has a sintered body on an aluminum foil substrate formed through a specific production process (in particular, rolling); therefore, its volume efficiency of electrostatic capacitance and bending strength are greatly improved compared to conventional materials.

Components of the electrode material are described below.

For example, a pure aluminum powder having a purity of 99.8% by weight or more is preferably used as the material for the aluminum powder. Preferable examples of the materials for the aluminum alloy powders include alloys containing one or more elements selected from silicon (Si), iron (Fe), copper (Cu), manganese (Mn), magnesium (Mg), chrome (Cr), zinc (Zn), titanium (Ti), vanadium (V), gallium (Ga), nickel (Ni), boron (B) and zirconium (Zr). The content of these elements in the aluminum alloy is preferably 100 weight ppm or less, and more preferably 50 weight ppm or less.

As the powder, one that has an average particle size $D_{50}$ before sintering of 0.5 to 100 μm is used. In particular, a powder having an average particle size $D_{50}$ of 1 to 15 μm can be preferably used as an electrode material for use in medium- to high-voltage aluminum electrolytic capacitors.

The term "average particle size $D_{50}$" in the present specification designates a particle size corresponding to 50% (median value) of all the particles in a particle size distribution curve that is obtained by using laser diffractometry to find a particle size and the number of particles having the diameter. The average particle size $D_{50}$ of the powder after sintering can be measured by observing the cross sections of the sintered body or sintered bodies with a scanning electron microscope. For example, the powder after sintering is in a state wherein a portion thereof is melted or particles are partially connected to each other. However, the portion having a nearly circular shape can be approximated as particles. More specifically, in the particle size distribution curve, which is calculated based on the particle sizes and the number of particles corresponding to each particle size, the particle size corresponding to 50% of all the particles is defined as the average particle size $D_{50}$ of powder after sintering. The average particle size $D_{50}$ before sintering and the average particle size $D_{50}$ after sintering obtained above are almost the same. The average particle sizes $D_{50}$ before and after rolling prior to sintering are also substantially the same.

There is no particular limitation to the shape of the powder, and a spherical, amorphous, scaly, fibrous, or other shape may be suitably used. A powder of spherical particles is particularly preferable.

The powder used may be produced by any known method. Examples of usable methods include an atomizing method, a melt spinning process, a rotating disk method, a rotating electrode process, and a rapid solidification process. In terms of industrial production, an atomizing method, in particular, a gas atomizing method, is preferable. More specifically, a powder obtained by atomizing molten metal is preferably used.

An electrode material for an aluminum electrolytic capacitor preferably has a bending strength of at least 10 bends. When the bending strength is less than 10 bends, the sintered body may be damaged during the production of an aluminum electrolytic capacitor. More preferably, the electrode material has a bending strength of 20 bends or more.

The sintered body is preferably produced by sintering powder while keeping a certain space between the particles. More specifically, the sintered body preferably has a three-dimensional network structure in which the particles are connected to each other by being sintered while having a space therebetween. This porous sintered body ensures a desired capacitance without the need for etching.

The sintered body of the present invention can be obtained by rolling and sintering a film made from a composition comprising a powder of at least one member selected from the group consisting of aluminum and aluminum alloys. The resulting sintered body has a porosity of 35 to 49% by volume. By sintering the film after rolling, an excellent electrostatic capacitance can be secured even when the sintered body has a porosity of 35 to 49% by volume. In other words, when a film is sintered to have a porosity of 35 to 49% by volume without rolling, an electrostatic capacitance as excellent as that of the present invention cannot be obtained. Therefore, the electrode material of the present invention has a volume efficiency of electrostatic capacitance higher than that of conventional materials. Furthermore, by sintering the film after rolling, its bending strength can be increased compared to the case where the film is sintered to have a porosity of 35 to 49% by volume without being subjected to rolling.

The sintered body preferably has a porosity of 35 to 49% by volume, and more preferably 40 to 48% by volume. The porosity in the present specification is a value calculated based on thickness and weight. The porosity is eventually determined based on the conditions of the rolling process of the film before sintering; however, as a preliminary step, the porosity may be controlled depending on, for example, the particle size of the aluminum or aluminum alloy powder used as the starting material, or the formulation of the paste composition (resin binder) containing the powder. In the present invention, by controlling the preliminary step and rolling process in a combinational manner, the porosity of the eventually obtained sintered body is adjusted to 35 to 49% by volume.

The sintered body may be formed on one side or both sides of the substrate. When forming a sintered body on both sides of the substrate, the sintered bodies are preferably symmetrically disposed having the substrate therebetween. The total thickness of each sintered body is preferably 10 to 1,000 μm, and more preferably 30 to 600 μm. These values are applied in both the case of forming a sintered body on one side of the substrate and the case of forming a sintered body on both sides of the substrate. In the case of forming a sintered body on both sides of the substrate, the thickness of the sintered body on each side is preferably ⅓ or more of the entire thickness (including the thickness of the aluminum foil substrate).

The average thickness of the sintered body is an average value obtained by measuring the thickness at seven points using a micrometer, and averaging five of those values, excluding the maximum and minimum values.

In the present invention, as the substrate for supporting the sintered body, an aluminum foil substrate is used. Prior to the formation of the sintered body, the surface of the aluminum foil substrate may be roughened in advance. The surface roughening method is not particularly limited, and any known technique, such as washing, etching, or blasting, may be employed.

The material for the aluminum foil for use as a substrate is not particularly limited and pure aluminum or an aluminum alloy may be used. The aluminum foil used in the present invention includes aluminum alloys containing one or more elements selected from silicon (Si), iron (Fe), copper (Cu), manganese (Mn), magnesium (Mg), chromium (Cr), zinc (Zn), titanium (Ti), vanadium (V), gallium (Ga), nickel (Ni), and boron (B) within a necessary amount and aluminum containing a limited amount of the above-mentioned inevitable impurity elements.

The thickness of the aluminum foil is not particularly limited, and preferably in the range of 5 μm or more and 100 μm or less, and particularly preferably in the range of 10 μm or more and 50 μm or less.

The aluminum foil may be produced by any known method. For example, the aluminum foil can be obtained by preparing a molten metal of aluminum or an aluminum alloy having a specific formulation as described above, casting the molten metal to obtain an ingot, and applying appropriate homogenization to the ingot. The resulting ingot is then subjected to hot rolling and cold rolling to obtain an aluminum foil.

During the aforementioned cold rolling process, intermediate annealing may be conducted at a temperature within a range of 50 to 500° C., and, in particular, 150 to 400° C. After the cold rolling process, annealing may be conducted at a temperature range of 150 to 650° C., and particularly from 350 to 550° C. to obtain a soft foil.

The electrode material of the present invention may be used in a low-voltage, medium-voltage or high-voltage aluminum electrolytic capacitor. In particular, the electrode material is suitable for use in a medium-voltage or high-voltage (medium- to high-voltage) aluminum electrolytic capacitor.

When used as an electrode for an aluminum electrolytic capacitor, the electrode material of the present invention can be used without being etched. More specifically, the electrode material of the present invention may be used as an electrode (electrode foil) as is or by only being anodized, without the need for etching.

An electrolytic capacitor can be obtained by a process comprising: laminating an anode foil prepared by using the electrode material of the present invention, and a cathode foil with a separator therebetween; winding the laminate to form a capacitor element; impregnating the capacitor element with an electrolyte; housing the capacitor element containing the electrolyte in a case; and sealing the case with a sealing material.

2. Method for Producing Electrode Material for Aluminum Electrolytic Capacitor The method for producing an electrode material for an aluminum electrolytic capacitor of the present invention is not particularly limited. An example of a usable method is described below.

The method comprises the steps of:

Step 1: forming a film made from a composition comprising a powder of at least one member selected from the group consisting of aluminum and aluminum alloys on an aluminum foil substrate; wherein (1) the powder has an average particle size $D_{50}$ of 0.5 to 100 μm, (2) the film is formed on one surface or both surfaces of the aluminum foil substrate, and the total thickness of the film or films is more than 10 μm but not exceeding 1,150 μm, Step 2: rolling the film, after Step 1, in such a manner that when the rolled film is sintered, the sintered body has a porosity of 35 to 49% by volume.

Step 3: sintering the film, after Step 2, at a temperature in the range of 560 to 660° C., the method being free from an etching treatment.

The present invention is explained in detail below with reference to Production Examples.

Step 1

In Step 1, a film made from a composition containing a powder of at least one member selected from the group consisting of aluminum and aluminum alloys is laminated onto one or both surfaces of an aluminum foil substrate, wherein, (1) the powder has an average particle size $D_{50}$ of 0.5 to 100 μm, (2) the film is formed on one surface or both surfaces of the aluminum foil substrate, and the total thickness of the film or films is more than 10 μm but not exceeding 1,150 μm.

The formulation (components) of the aluminum or aluminum alloys may be as described above. For example, a pure aluminum powder having a purity of 99.8% by weight or more is preferably used as the aluminum powder. The materials mentioned above may also be used as an aluminum foil substrate.

The composition may contain, if necessary, a resin binder, a solvent, a sintering aid, a surfactant, etc. For these, known or commercially available products can be used. In particular, in the present invention, the composition is preferably used as a paste composition comprising at least one member selected from the group consisting of resin binders and solvents. Using such a paste composition enables efficient film formation.

Resin binders are not limited, and suitable examples thereof include carboxy-modified polyolefin resins, vinyl acetate resins, vinyl chloride resins, vinyl chloride-vinyl acetate copolymers, vinyl alcohol resins, butyral resins, polyvinyl fluoride resins, acrylic resins, polyester resins, urethane resins, epoxy resins, urea resins, phenol resins, acrylonitrile resins, cellulose resins, paraffin wax, polyethylene wax, and other synthetic resins or waxes; and tar, glue, sumac, pine resin, beeswax, and other natural resins or waxes. These binders are divided into, depending on the molecular weight, the type of resin, etc., those that volatilize upon heating and those that remain as a residue together with aluminum powder as a result of pyrolysis. They can be used depending on the desired electrostatic characteristics, etc.

Moreover, any known solvents may be used. For example, in addition to water, an organic solvent, such as ethanol, toluene, ketones, and esters, may be used.

A film may be formed, for example, by rolling, brushing, spraying, dipping, or other application methods, or by a known printing method, such as silk-screen printing.

A film may be formed on one or both surfaces of the substrate. When forming a film on both surfaces of the substrate, the two films are preferably symmetrically disposed having the substrate therebetween. The total film thickness is preferably more than 10 μm but not exceeding 1,150 μm, and more preferably in the range of 20 to 570 μm. The total film thickness may be selected so that the sintered body ultimately obtained after rolling and sintering has a total thickness of 10 to 1,000 μm. These values are applied in both the case of forming a film on one side of the substrate and the case of forming a film on both sides of the substrate. However, in the case of forming a film on both sides of the substrate, the thickness of the film on each side is preferably ⅓ or more of the entire thickness (including the thickness of the aluminum foil substrate).

The average thickness of the films is an average value obtained by measuring the thickness at seven points using a micrometer, and averaging five of those values, excluding the maximum and minimum values.

The film may be dried at a temperature within the range of 20 to 300° C., if necessary.

Step 2

In Step 2, the film is rolled. More specifically, the film is rolled in such a manner that when the rolled film is sintered, the resulting sintered body has a porosity of 35 to 49% by volume (preferably, 35 to 44% by volume). The rolling reduction is not particularly limited, and the rolling is preferably conducted in such a manner that the rolling reduction of the resulting sintered body falls within a range that exceeds 0% but is 15% or less (preferably, 4 to 15%).

Although the rolling process method is not limited, rolling can be conducted using, for example, rolls, a known press machine, etc.

Step 3

In Step 3, the film is sintered at a temperature in the range of 560 to 660° C. The sintering temperature is generally 560 to 660° C., preferably 570 to 650° C., and more preferably 580 to 620° C. The sintering time, which varies depending on the sintering temperature, etc., can be suitably determined generally within the range of about 5 to 24 hours. The sintering atmosphere is not particularly limited, and may be any of a vacuum atmosphere, an inert gas atmosphere, an oxidizing gas atmosphere (air), a reducing atmosphere, and the like. In particular, a vacuum atmosphere or a reducing atmosphere is preferable. The pressure conditions may also be any of a normal pressure, a reduced pressure, and an increased pressure.

After Step 2 but prior to Step 3, a heat treatment (degreasing treatment) is preferably conducted in such a manner that the temperature is maintained within the range of 200 to 450° C. for 5 hours or more. Such a degreasing treatment allows oil adhered during the rolling process to be sufficiently removed. The heating atmosphere is not particularly limited, and may be, for example, any of a vacuum atmosphere, an inert gas atmosphere, and an oxidizing gas atmosphere. The pressure conditions may also be any of a normal pressure, a reduced pressure, and an increased pressure.

Step 4

The electrode material of the present invention can be obtained in Step 3 described above. The electrode material can be directly used as an electrode (electrode foil) for an aluminum electrolytic capacitor without etching. Alternatively, the electrode material of the present invention may be anodized in Step 4, if necessary, to form a dielectric, which is used as an electrode. Although there is no particular limitation to the anodization conditions, the anodization may typically be conducted by applying a current of about 10 mA/cm$^2$ or more to 400 mA/cm$^2$ to the electrode material for 5 minutes or more in a boric acid solution with a concentration of 0.01 mol or more and 5 mol or less at a temperature of 30° C. or more and 100° C. or less.

EXAMPLES

The present invention is described in more detail below with reference to Examples and Comparative Examples.

The bending strength of each electrode material was measured in accordance with the MIT Automatic Folding Endurance Test defined by the Electronic Industries Association of Japan (EIAJ RC-2364A). The test was conducted using the MIT Folding Endurance Tester specified in JIS P8115. In this test, the number of bends at the point of breaking was determined to be the bending strength of each electrode material. The number of bends was counted as shown in FIG. 1. Specifically, bending a test piece 90° was counted as one bend. When the test piece was returned to its original position, the number of bends became two. When the test piece was bent 90° toward the opposite direction, the number of bends became three. When the test piece was then returned to its original position again, the number of bends was counted as four. Table 1 shows the results of the bending strength measurements.

The electrostatic capacity of each of the electrode materials was measured in the following manner. The electrode material was subjected to anodization at 250 V in an aqueous boric acid solution (50 g/L), and then the electrostatic capacity was measured in an aqueous ammonium borate solution (3 g/L). The measurement projection area was 10 cm$^2$.

Conventional Example 1, Examples 1 to 4, and Comparative Examples 1 and 2

An aluminum powder having an average particle diameter $D_{50}$ of 3 μm (60 parts by weight; JIS A1080, manufactured by Toyo Aluminium K.K., product number: AHUZ58FN) was mixed with a cellulose binder (40 parts by weight, resin content: 7% by weight) to obtain a coating solution having a solids content of 60% by weight.

The coating solution was applied to both sides of each 40-μm-thick aluminum foil (500 mm×500 mm) to form a total film thickness of 94 μm using a comma coater, and the resulting films were dried.

Subsequently, a rolling process was applied to the films in such a manner that the films had the thicknesses shown in Table 1 (lamination thickness=film thickness=sintered body thickness). Thereafter, the results were subjected to degreasing at 400° C., and then sintered at 620° C. in an argon gas atmosphere for 8 hours to obtain electrode materials.

Table 1 shows the number of bends for each lamination thickness.

TABLE 1

| | Lamination thickness (μm) | Porosity (% by volume) | Rolling reduction (%) | Electrostatic capacitance (μF/10 cm$^2$) | Bends (number) |
|---|---|---|---|---|---|
| Conventional Example 1 | 94 | 49.9 | 0.0 | 14.0 | 10 |
| Example 1 | 90 | 44.0 | 4.3 | 14.1 | 20 |
| Example 2 | 86 | 38.7 | 8.5 | 14.0 | 42 |
| Example 3 | 82 | 37.5 | 12.8 | 14.0 | 42 |
| Example 4 | 80 | 35.6 | 14.9 | 13.9 | 46 |
| Comparative Example 1 | 77 | 33.0 | 18.1 | 8.3 | 45 |
| Comparative Example 2 | 72 | 27.6 | 23.4 | 1.8 | 45 |

As is clear from the results of Table 1, compared to the electrode material obtained in Conventional Example 1 wherein no rolling process was applied to the film, the electrode materials of Examples 1 to 4, which were obtained by applying a rolling process to the films to adjust the porosity thereof to 35 to 49% by volume, exhibited remarkable improvement in bending strength while maintaining the same level of electrostatic capacitance as that of Conventional Example 1. Such remarkable effects can be achieved presumably because the particles in the finally obtained sintered body closely adhere to each other by undergoing the rolling process. In conventional techniques, when a sintered body is obtained by sintering a film without applying a rolling process, a practically usable level of electrostatic capacitance is difficult to obtain when the porosity of the sintered body is less than 40% by volume. However, the electrode materials obtained in Examples 2 to 4 of the present invention attain excellent electrostatic capacitance regardless of the fact that their porosity is less than 40% by volume. The increase in the number of bends in Examples 1 to 4 is not merely attributable to the decrease in the lamination thickness, and the bending strength thereof was remarkably improved compared to the sintered bodies having the same level of porosity obtained by sintering a film without rolling.

Conventional Example 2, Examples 5 to 6, and Comparative Examples 3 and 4

An aluminum powder having an average particle size $D_{50}$ of 9.0 μm (60 parts by weight: JIS A1080, manufactured by Toyo Aluminium K.K., product name: AHUZ560F) was mixed with a cellulose binder (40 parts by weight, resin content: 7% by weight) to obtain a coating solution having a solids content of 60% by weight.

The coating solution was applied to both sides of each 40-μm-thick aluminum foil (500 mm×500 mm) to form a total film thickness of 120 μm using a comma coater, and the resulting films were dried.

Subsequently, a rolling process was applied to the films in such a manner that the films had the thicknesses shown in Table 2 (lamination thickness=film thickness=sintered body thickness), and the results were subjected to degreasing at 400° C. and sintering at 620° C. in an argon gas atmosphere for 8 hours to obtain electrode materials.

Table 2 shows the number of bends for each lamination thickness.

TABLE 2

| | Lamination thickness (μm) | Porosity (% by volume) | Rolling reduction (%) | Electrostatic capacitance (μF/10 cm$^2$) | Bends (number) |
|---|---|---|---|---|---|
| Conventional Example 2 | 120 | 51.2 | 0.0 | 12.2 | 2 |
| Example 5 | 114 | 45.3 | 5.0 | 12.1 | 41 |
| Example 6 | 110 | 42.1 | 8.3 | 12.1 | 58 |
| Example 7 | 103 | 36.8 | 14.2 | 12.2 | 58 |
| Comparative Example 3 | 99 | 33.4 | 17.5 | 7.8 | 59 |
| Comparative Example 4 | 94 | 29.9 | 21.7 | 1.9 | 58 |

As is clear from the results of Table 2, compared to the electrode material obtained in Conventional Example 2 wherein no rolling process was applied to the film, the electrode materials of Examples 5 to 7, which were obtained by applying a rolling process to the films to adjust the porosity thereof to 35 to 49% by volume exhibited remarkable improvement in bending strength while maintaining the same level of electrostatic capacitance as that of Conventional Example 2. Because Tables 1 and 2 indicate the same behavior, it can be concluded that regardless of the difference in average particle size $D_{50}$, excellent electrostatic capacitance and bending strength can be achieved by adjusting the final porosity to 35 to 49% by volume by the application of a rolling process to the film.

Conventional Example 3, Examples 8 to 10, and Comparative Examples 5 and 6

An aluminum powder having an average particle size $D_{50}$ of 9.0 μm (60 parts by weight: JIS A1080, manufactured by Toyo Aluminium K.K., product name: AHUZ560F) was mixed with a cellulose binder (40 parts by weight, resin content: 7% by weight) to obtain a coating solution having a solids content of 60% by weight.

The coating solution was applied to both sides of each 40-μm-thick aluminum foil (500 mm×500 mm) to form a total film thickness of 600 μm using a comma coater, and the resulting films were dried.

Subsequently, a rolling process was applied to the films in such a manner that the films had the thicknesses shown in Table 3 (lamination thickness=film thickness=sintered body thickness). Thereafter, the results were subjected to degreasing at 400° C., and then sintered at 620° C. in an argon gas atmosphere for 8 hours to obtain electrode materials.

Table 3 shows the electrostatic capacitance for each lamination thickness.

TABLE 3

| | Lamination thickness (μm) | Porosity (% by volume) | Rolling reduction (%) | Electrostatic capacitance (μF/10 cm$^2$) |
|---|---|---|---|---|
| Conventional Example 3 | 600 | 51.2 | 0.0 | 61.3 |
| Example 8 | 572 | 45.4 | 4.7 | 61.1 |
| Example 9 | 555 | 43.3 | 7.5 | 61.1 |
| Example 10 | 512 | 36.5 | 14.6 | 61.2 |
| Comparative Example 5 | 492 | 32.0 | 18.0 | 30.8 |
| Comparative Example 6 | 471 | 30.2 | 21.5 | 5.5 |

As is clear from the results of Table 3, compared to the electrode material obtained in Conventional Example 3 wherein no rolling process was applied to the film, the electrode materials of Examples 8 to 10, which were obtained by applying a rolling process to the films to adjust the porosity thereof to 35 to 49% by volume, maintained the same level of electrostatic capacitance as that of Conventional Example 3. The lamination thickness of the electrode materials of Conventional Example 3, Examples 7-9, and Comparative Examples 5-6 was too thick to be tested using the MIT Automatic Folding Endurance Test; therefore, the number of bends was not measured.

The invention claimed is:

1. An electrode material for an electrolytic capacitor, comprising, as constituent elements, a sintered body of a powder of at least one member selected from the group consisting of aluminum and aluminum alloys, and an aluminum foil substrate supporting the sintered body thereon, wherein
   (1) the powder has an average particle size $D_{50}$ of 0.5 to 100 μm,
   (2) the sintered body is formed on one surface or both surfaces of the aluminum foil substrate and has a total thickness of 10 to 1,000 μm,
   (3) the porosity of the sintered body is 35 to 49% by volume, and
   (4) the sintered body is obtained by applying a rolling process to a film made from a composition comprising a powder of at least one member selected from the group consisting of aluminum and aluminum alloys, and subsequently sintering the film.

2. A method for producing an electrode material for an aluminum electrolytic capacitor, comprising the steps of:
   Step 1: forming a film made from a composition comprising a powder of at least one member selected from the group consisting of aluminum and aluminum alloys on an aluminum foil substrate; wherein
   (1) the powder has an average particle size $D_{50}$ of 0.5 to 100 μm,
   (2) the film is formed on one surface or both surfaces of the aluminum foil substrate, and the total thickness of the film or films is more than 10 μm but not exceeding 1,150 μm,
   Step 2: rolling the film, after Step 1, in such a manner that the film has a reduction within a range that exceeds 0% but is 15% or less, and that when the rolled film is sintered, the sintered body has a porosity of 35 to 49% by volume, and
   Step 3: sintering the film, after Step 2, at a temperature in the range of 560 to 660° C.,
   the method being free from an etching treatment.

3. The production method according to claim 2, wherein the rolling in step 2 is performed in such a manner that the film has a reduction with a range of 4% to 15%.

* * * * *